United States Patent
Yin

(10) Patent No.: US 11,570,501 B2
(45) Date of Patent: Jan. 31, 2023

(54) CONNECTION ALLOCATION METHOD IN MEDIA PLAYING PROCESS, MEDIA PLAYING DEVICE AND STORAGE MEDIUM

(71) Applicant: Beijing Bytedance Network Technology Co., Ltd., Beijing (CN)

(72) Inventor: Guohui Yin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 348 days.

(21) Appl. No.: 16/766,639

(22) PCT Filed: Aug. 31, 2018

(86) PCT No.: PCT/CN2018/103465
§ 371 (c)(1),
(2) Date: May 22, 2020

(87) PCT Pub. No.: WO2019/227737
PCT Pub. Date: Dec. 5, 2019

(65) Prior Publication Data
US 2020/0374577 A1 Nov. 26, 2020

(30) Foreign Application Priority Data
May 29, 2018 (CN) .......................... 201810531048.3

(51) Int. Cl.
*H04N 21/262* (2011.01)
*H04N 21/234* (2011.01)
(Continued)

(52) U.S. Cl.
CPC . *H04N 21/26216* (2013.01); *H04N 21/23406* (2013.01); *H04N 21/443* (2013.01); *H04N 21/4782* (2013.01); *H04N 21/8173* (2013.01)

(58) Field of Classification Search
None
See application file for complete search history.

(56) References Cited

U.S. PATENT DOCUMENTS

| 2014/0006556 A1* | 1/2014 | Shapiro | ................... H04L 67/04 709/217 |
| 2015/0067819 A1* | 3/2015 | Shribman | ............... H04L 67/60 709/218 |

(Continued)

FOREIGN PATENT DOCUMENTS

| CN | 103516536 A | 1/2014 |
| CN | 103780931 A | 5/2014 |

(Continued)

OTHER PUBLICATIONS

International Patent Application No. PCT/CN2018/103465; Int'l Search Report; dated Dec. 11, 2018; 2 pages.

*Primary Examiner* — Junior O Mendoza
(74) *Attorney, Agent, or Firm* — BakerHostetler

(57) ABSTRACT

The disclosure provides a connection allocation method in a media playing process, including: receiving playing requests initiated by a player embedded in a webpage, wherein the player plays media data in the webpage; storing the received playing requests into a buffering queue to queue according to a receiving sequence of the playing requests; and allocating connections to the playing requests in the buffering queue according to an upper limit of the number of concurrent connections usable for the buffering queue and the receiving sequence, wherein the connections are used for the player to request to-be-played media data. The disclosure further provides a media playing device and a storage medium.

17 Claims, 8 Drawing Sheets

(51) Int. Cl.
*H04N 21/443* (2011.01)
*H04N 21/4782* (2011.01)
*H04N 21/81* (2011.01)

(56) References Cited

U.S. PATENT DOCUMENTS

2016/0359765 A1 12/2016 Herrero
2020/0128064 A1* 4/2020 Choi ..................... H04L 65/40
2020/0351331 A1* 11/2020 Panguluri .......... H04N 21/4668

FOREIGN PATENT DOCUMENTS

| CN | 104850560 A | 8/2015 |
| CN | 105430529 A | 3/2016 |
| CN | 105721924 A | 6/2016 |
| CN | 106303712 A | 1/2017 |
| CN | 106358050 A | 1/2017 |
| CN | 106411777 A | 2/2017 |
| CN | 107959659 A | 4/2018 |

\* cited by examiner

CONNECTION ALLOCATION METHOD IN MEDIA PLAYING PROCESS, MEDIA PLAYING DEVICE AND STORAGE MEDIUM

CROSS-REFERENCE TO RELATED APPLICATION

The present disclosure is the U.S. National Stage of International Application No. PCT/CN2018/103465, filed on Aug. 31, 2018, which claims the priority benefit of Chinese Application No. 201810531048.3, filed on May 29, 2018, which is incorporated herein by reference in its entirety.

TECHNICAL FIELD

The disclosure relates to a media playing technology, and in particular to a connection allocation method in media playing process, media playing device and storage medium.

BACKGROUND

At present, serving as a generally-used video playing scheme, media playing based on a webpage may reduce the tedious operation for installing dedicated client sides.

However, due to the limit of network bandwidth of the webpage, when the same page in the webpage has a plurality of playing windows, the situation of network congestion is unavoidable, for example, the situation that other services (such as webpage browsing) in the webpage are delayed or are not responding or the situation that the video playing windows are delayed or are not responding appears. For the technical problem, no effective solution has been proposed in the current related technologies.

SUMMARY

Accordingly, embodiments of the disclosure provide a connection allocation method in media playing process, media playing device and storage medium capable of improving the real-time response performance of the webpage in which the player is embedded.

Technical solutions of embodiments of the disclosure are achieved as follows.

On a first aspect, an embodiment of the disclosure provides a connection allocation method in a media playing process, including receiving playing requests initiated by a player embedded in a webpage, wherein the player plays media data in the webpage; storing the received playing requests into a buffering queue to queue according to a receiving sequence of the playing requests; and allocating connections to the playing requests in the buffering queue according to an upper limit of the number of concurrent connections usable for the buffering queue and the receiving sequence: wherein the connections are used for the player to request to-be-played media data.

On a second aspect, an embodiment of the disclosure further provides a media playing device, including a receiver, disposed to receive playing requests initiated by a player embedded in a webpage, wherein the player plays media data in the webpage; a memory, disposed to store the received playing requests into a buffering queue to queue according to a receiving sequence of the playing requests; and an allocator, disposed to allocate connections to the playing requests in the buffering queue according to an upper limit of the number of concurrent connections usable for the buffering queue and the receiving sequence; wherein the connections are used for the player to request to-be-played media data.

On a third aspect, an embodiment of the disclosure provides a media playing device, including a memory, disposed to store an executable instruction, and a processor, disposed to follow the connection allocation method in a media playing process according to any one of embodiment of the disclosure to implement the executable instruction stored in the memory.

On a fourth aspect, an embodiment of the disclosure further provides a storage medium, storing an executable instruction; disposed to perform the connection allocation method in a media playing process according to any one of embodiment of the disclosure when the executable instruction is followed.

Embodiments of the disclosure provided the connection allocation method in a media playing process, media playing device and storage medium. When a plurality of playing windows exists on the same page in a webpage, the playing requests of the player are stored in the buffering queue to queue during media playing in the webpage, and the corresponding connections are allocated to the playing requests in the buffering queue according to the upper limit of the number of the concurrent connections usable for the buffering queue and the receiving sequence of the playing requests, which can avoid other services in the web page, such as web page browsing, delays or unresponsiveness and media playing windows delays or unresponsiveness caused by plurality of playing windows occupying connections, and effectively improve the real-time response performance of the webpage in which the player is embedded.

DETAILED DESCRIPTION OF THE EMBODIMENTS

In order to better clarify the objective, contents and advantages of the disclosure, the disclosure will be further illustrated in detail with reference to drawings therewith. The described embodiments should not be regarded as restriction to the disclosure. All the other embodiments obtained by a person skilled in the art without creativity should be included in the protective scope of the disclosure.

Unless otherwise specified, all technical and scientific terms employed in the disclosure represent the same meaning as those accepted by a person skilled in the art. The terms therein are purely for a purpose of depicting concrete embodiments rather than limiting the disclosure.

Before further expressing the disclosure, substantives and technical terms in embodiments of the disclosure will be explained. The substantives and technical terms in the embodiments of the disclosure refer to following definitions.

1) A media file indicates a file stores encoded media data such as at least one of audio data and video data in a manner of boxes, which likewise contains moov (aka. metadata) expressing the media information to ensure media data to be decoded correctly.

For instance, a media file formed by encapsulating MP4 box format encapsulation multimedia data with a moving picture experts group (MPEG)-4 is an MP4 file. Typically, the MP4 file stores advanced video coding (AVC), namely H.264, or video data encoded by the MPEG-4 (part 2) standard and audio data encoded by the advanced audio coding (AAC) standard. There is no doubt that other encoding modes of video and audio will not be excluded.

Figure 1:
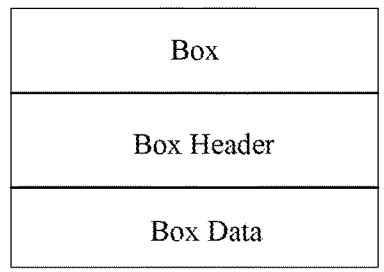
FIG. 1 is an optional structural schematic diagram of a box provided by the embodiment of the disclosure.

2) A box, also known as container, is a component of an object oriented defined by a sole type identifier and length, referring to FIG. 1, which is an optional structural schematic diagram of a box provided by the embodiment of the disclosure, including a box header and box data, and binary data conveying various information filled therein.

Figure 2:
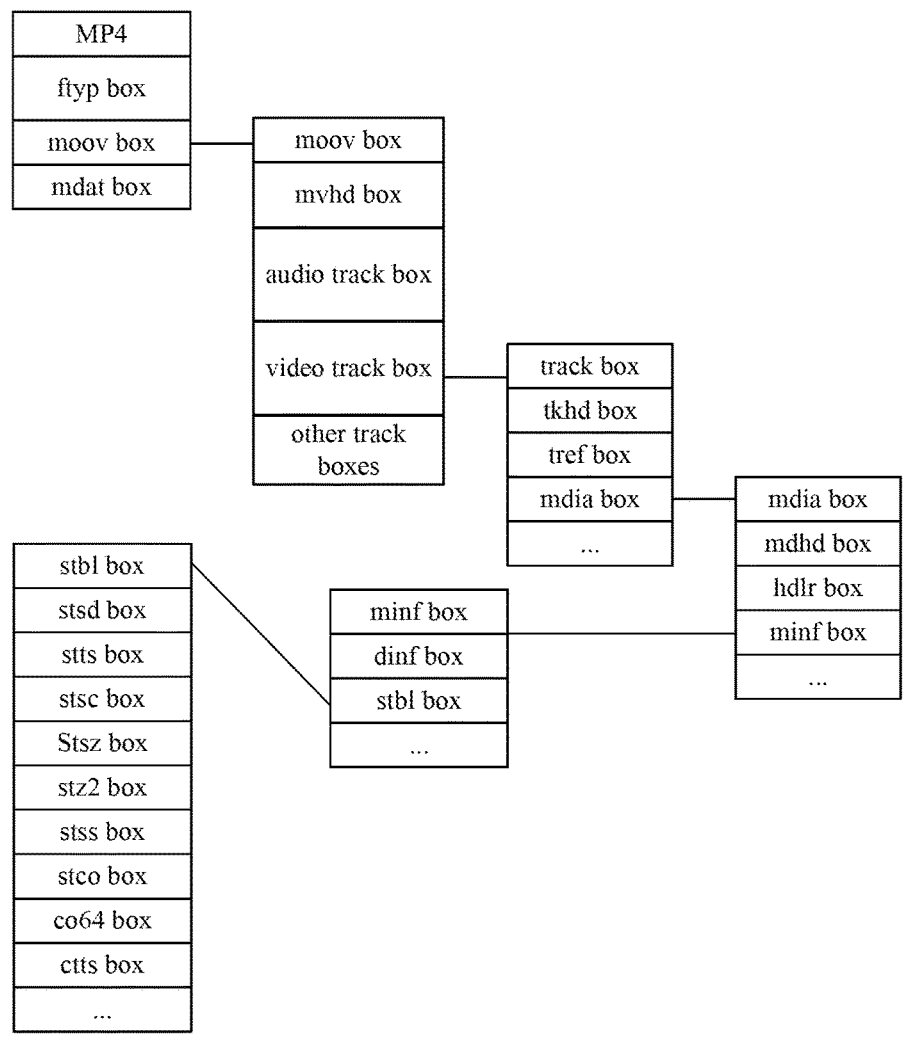
FIG. 2 is an optional schematic diagram of an encapsulation structure of an MP4 file provided by the embodiment of the disclosure.

The box header includes size and type. The size specifies the volume of the length storage space of the box occupied in the media file. The type specifies the type of the box. Referring to FIG. 2, which is an optional schematic diagram of an encapsulation structure of an MP4 file provided by the embodiment of the disclosure. Fundamental types of boxes involved in the MP4 file contain an ftyp box, an moov box and an mdat box.

The box data section can store specific data, and the box is called a data box. The box data section can further encapsulate other types of boxes, and the boxes can be containers of boxes.

3) A track is also named a stream, which is a relative sample arranged in chronological order in the mdat box. Regarding the media data, the track signifies a video frame sequence or an audio frame sequence, further incorporating a subtitle track synchronized with the video frame sequence. A contiguous set of samples in one track are chunks.

4) An ftyp box is a box for storing the size, namely a length of occupied bytes, and the type of the file in the media file. As shown in FIG. 2, the binary data stored in the ftyp box describe the type and the compatibility of the file box according to the standard byte length.

5) An moov box is a box storing moov that is data to depict multimedia data in the mdat box in the media file. Information recorded as binary data stored in the moov box in the MP4 file is called media information.

As shown in FIG. 2, a type of the box of the header of the moov box recorded as binary data is the moov box. The box data division encapsulates an mvhd box storing total information of the MP4 file, which is independent from the MP4 file, and relative to properties of the MP4 file, including duration, creation time and modification time, etc.

The mdat box of the media file can contain sub-boxes corresponding to multi-tracks, such as an audio track box and a video track box. The sub-boxes of the audio track box and the video track box include quotation and description of the media data of corresponding tracks. Necessary sub-boxes include a box describing characteristics and total information such as duration, width and height, which is labelled as a tkhd box, and a box recording media information of tracks such as media types and sampling information, which is labeled as an mdia box.

The sub-boxes encapsulated in the mdia box can include the a box recording relevant properties and contents of tracks, which is labeled as an mdhd box, a box recording playing procedure information of media, which is labeled as an hdlr box, a box describing the media information of media data in tracks, which is labeled as an minf box; the minf box further encapsulates a sub-box to interpret how to locate media information, which is labeled as a dinf box, and a sub-box for recording all the time information such as decoding time and displaying time, location information and encoding/decoding information of samples in tracks, which is labeled as an stbl box.

Figure 3:
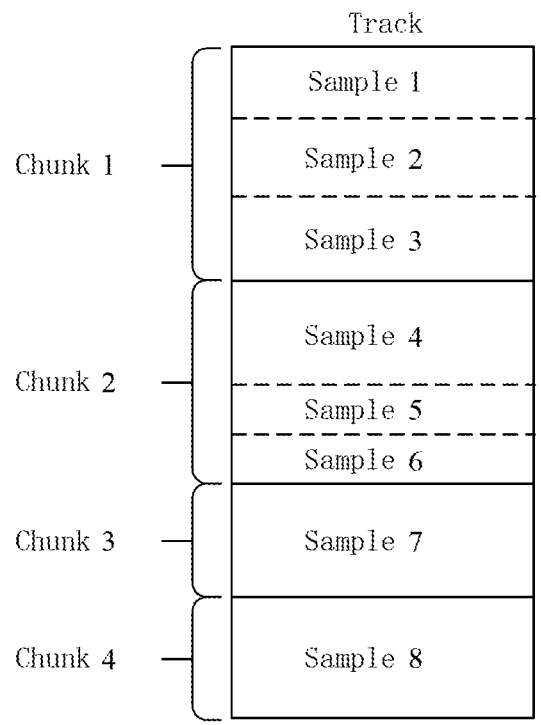
FIG. 3 is a structural schematic diagram of an media data box in a media file storing media data provided by the embodiment of the disclosure.

Referring to FIG. 3, which is a structural schematic diagram of an mdat box in a media file storing media data provided by the embodiment of the disclosure. The time, type, size and location in the mdat box of samples can be explained by media information recognized from binary data in the stbl box. Each of the sub-boxes in the stbl box will be illustrated as follows.

The stsd box includes a sample description table. According to different encoding schemes and quantities of files storing data, each media file can have one or more description table(s). The description information of each sample can be found through searching the description table. The description information can guarantee correctness in decoding samples. Each media type stores corresponding description information. For instance, with respect to a video medium, the description information is a structure of an image.

The stts box stores duration information of samples, as well as providing a table for mapping time such as decoding time and the sequence number of a sample. A sample at any time of the media file can be located by the stts box; the stts box further uses other tables to map the size and pointer of a sample. Each entry offers sequence numbers of successive samples in an identical time offset and the offset of samples. An intact mapping table of time-sample can be established by progressively increasing the offsets. A computational formula is as follows:

$$DT(n+1)=DT(n)+STTS(n) \qquad (1)$$

Where STTS(n) is the duration of the nth sample; DT(n) is the display time of the nth sample. An order of the samples is in accordance with the time sequence; therefore, the offset will always be nonnegative. Generally, DT beginning from 0, and taking the display time of an $i^{th}$ sample as an example, the computational formula is as follows:

$$DT(i)=SUM \text{ (for } j=0 \text{ to } i-1 \text{ of delta}(j)) \qquad (2)$$

The sum of all offsets is the length of media data in the track.

An stss (Time-To-Sample Atoms) box records sequence numbers of key frames in the media file.

A stsc (Sample-To-Chunk Atom) box records a mapping relation between samples and chunks storing the samples. The table maps the relation between the sequence numbers of samples and those of chunks. The chunk containing a specific sample can be determined by searching the table.

A stco box defines the location of each chunk in tracks. The location is represented by the offset of an initial byte of the mdat box and a length corresponding to the initial byte, namely a size.

A stsz (Sample Size Atom) box records a volume/size of each sample in the media file.

6) An mdat box is a box for storing multimedia data in the media file. For instance, an mdat box in an MP4 file, as shown in FIG. 3, a sample is a unit stored in the mdat box. In a chunk stored in the media file, lengths of chunks and those of samples can mutually be different.

7) A fragmented media file is a sub-file formed by dividing the media file. Each fragmented media file can be decoded independently.

Taking the MP4 file as an example, the media data in the MP4 file is divided according to the key frames. The divided media data and corresponding moov are encapsulated to form a fragmented MP4 (FMP4) file. The moov in each FMP4 file can ensure the media data to be decoded correctly.

Figure 4:
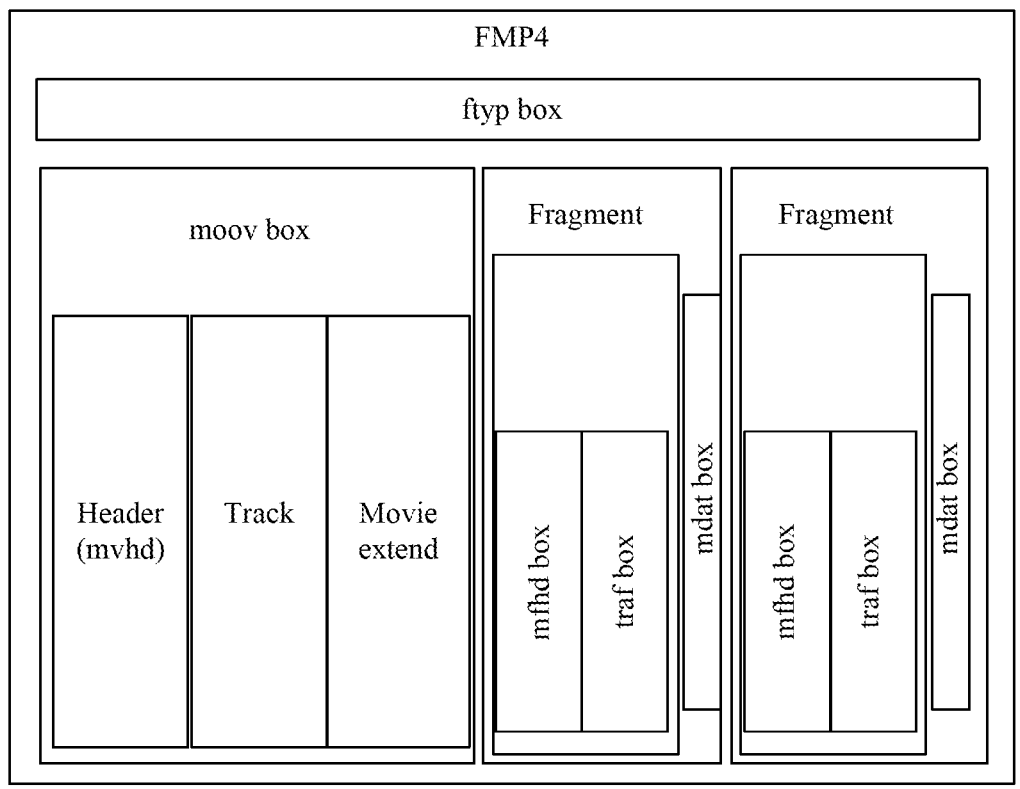
FIG. 4 is an optional schematic diagram of an encapsulation structure of an FMP4 file provided by the embodiment of the disclosure.

For instance, when the MP4 file as shown in FIG. 2 is converted to multiple FMP4 files, referring to FIG. 4, which is an optional schematic diagram of an encapsulation structure of an FMP4 file provided by the embodiment of the disclosure. One MP4 file can be converted to be multiple FMP4 files. Each FMP4 file includes three basic boxes: an moov box, an moof box and an mdat box.

The moov box includes the MP4-leveled moov, which is used for describing all media data of the MP4 file that the FMP4 files derived from, such as the duration, creation time and modification time of the MP4 file.

An moof box stores the fragmented moov, which describes media data encapsulated in the FMP4 file therein to ensure the media data in the FMP4 file to be able to be decoded.

One moof box and one mdat box constitutes one fragment of the fragmented MP4 file. One fragmented MP4 file can include one or more fragment(s). The moov encapsulated in each fragment guarantees media data encapsulated in fragments to be decoded independently.

8) A media source extensions (MSE) interface is an interface orienting players embedded in the network, which is interpreted by an interpreter during loading a webpage and achieved by running the frontend programming language such as JavaScript, with a function of providing playing media stream of the media element invoking Hyper Text Markup Language (HTML) to players, such as utilizing the video element and the audio element to perform functions of the video/audio.

9) A streaming media encapsulation format streaming media format is a media file encapsulating media data to be streaming media. The media file is unnecessary to be completely downloaded or additionally transcoded for being decoded and played. In other words, the encapsulation technology originally supports downing and playing at the same time. A typical file of the streaming media encapsulation format streaming media format includes a TS media file fragmentation based on the HTTP Live Streaming (HLS) technique, flash video (FLV) and so on.

10) A non-streaming media encapsulation format streaming media format is an encapsulation technology of decoding and playing after encapsulating media data to be a media file and completely downing the media file. A typical file of the non-streaming media encapsulation format streaming media format includes an MP4 file, a windows media video (WMV) file, an advanced streaming format (ASF) file and so on.

It is necessary to point out that the MP4 file originally fails to play in a form of streaming media, but the technical effect of downing and playing at the same time can be acquired by online transcoding and subsequently delivering the transcoded streaming media to the player, or filling invalid binary data into the blank section of the incompletely downloaded MP4 file such as filling a blank section of an mdat box with invalid binary data when an ftyp box and an moov box are entirely downloaded. In the disclosure, encapsulation formats reject files of playing streaming media originally are defined to be non-streaming media formats.

Figure 5:
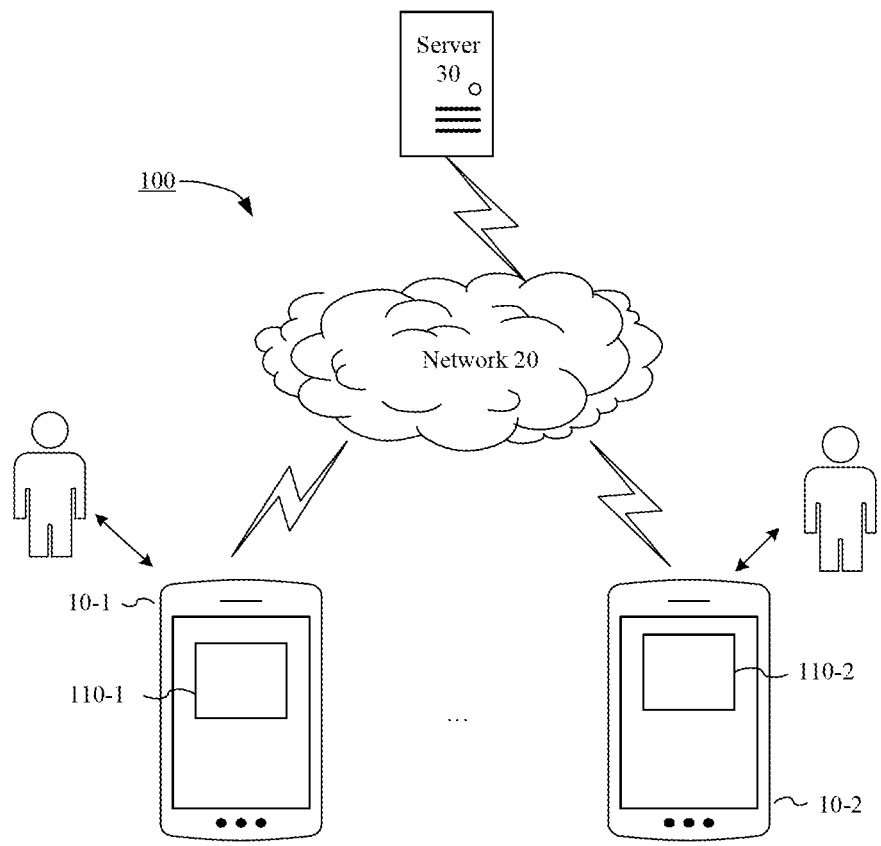
FIG. 5 is an optional architecture schematic diagram of a media playing system provided by the embodiment of the disclosure.

Firstly, the architecture of the media player system that implements this open embodiment is illustrated, as shown in FIG. 5, which is an optional schematic diagram of the media player system 100 provided by this open embodiment. In order to support an exemplary application, the media player that implements this open embodiment may be a software player, for example, a user terminal running the player, and the user terminal 10 (exemplarily showing the user terminal 10-1 and the user terminal 10-2) is connected to the server 30 over a network 20, the network 20 can be a wide area network or a local area network, or a combination of both, which transmits data over a wireless link.

The user terminal 10 plays the media file by embedding the player in the webpage, and displays the played content through the graphical interface 110 (exemplarily shown the graphical interface 110-1 and the graphical interface 110-2) during the playing process. The user terminal 10 stores the received playing requests into the buffering queue to queue according to the receiving sequence of the playing requests and allocates connections to the playing requests in the buffering queue according to the upper limit of the number of concurrent connections that usable for the buffering queue and the receiving sequence. The connections are used for the player to request to-be-played media data from the server 30.

Figure 6:
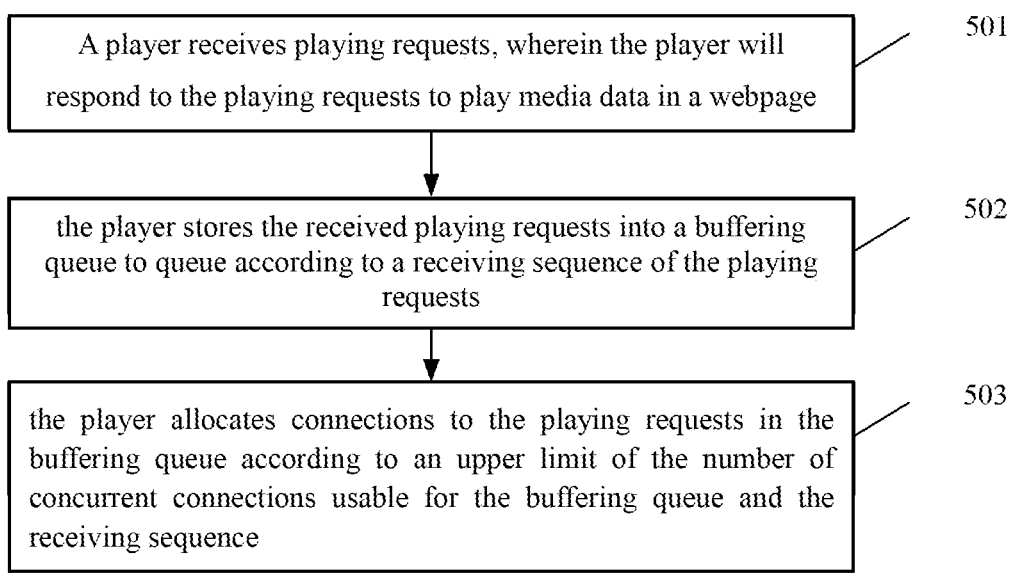
FIG. 6 is an optional implementation process schematic diagram of a connection allocation method in a media playing process provided by the embodiment of the disclosure.

The following is a description of a method for implementing the connection in the media playing process provided by the embodiment of the present disclosure. FIG. 6 is an optional implementation process schematic diagram of a connection allocation method in a media playing process provided by the embodiment of the disclosure. The terminal equipment realizing the embodiment of the disclosure implements the connection allocation method in a media playing process by applying to various types of players. As far as the terminal equipment, it can be a various terminal equipment such as desktop computer and laptop, that is, the terminal equipment can be a software/hardware implementation of the media playing device in an embodiment of the disclosed.

As an example, the player is an HTML5 (H5) player in a web page loaded by an embedded browser (or any application embedded with a browser), implemented in a front-end oriented language (such as JavaScript). When the browser loads a web page for media playing, the player code is downloaded to the browser along with the web page element. Since the player is implemented in a front-end oriented language, it does not need to be compiled, and the browser can directly interpret and execute the player code to realize the function of the player in the web page, which adapts to a wide range of platforms and achieves high efficiency.

As another example, the player is an application for playing a media file, which is installed into the terminal equipment by running a pre-compiled packaged installation package program in the terminal equipment.

As shown in FIG. 6, an implementation process of a connection allocation method in a media playing process in the embodiment of the disclosure will be described in conjunction with steps as shown in FIG. 6.

Step 501: a player receives playing requests, wherein the player will respond to the playing requests to play media data in a webpage.

In the embodiment of the disclosure, the player may be displayed in playing windows in the webpage in an embedded way, namely the playing requests are initiated by the player embedded in the webpage. In an actual application, the player may perform concurrent playing through a plurality of concurrent playing windows in the webpage when playing a plurality of media files in the webpage.

In the embodiment of the disclosure, the playing requests may be requests based on an HTTP (Hyper Text Transport Protocol) and initiated by the player through the webpage, of course, the playing requests may also be other types of requests for the player to request to play the media files, such as requests based on HTTPS (Hyper Text Transfer Protocol over Secure Socket Layer) and initiated by the player through the webpage, and for the latter, the phenomenon that data is intercepted and cracked by a third party in a transmission process may be avoided due to the adoption of an encrypted transmission way.

It should be noted that the media data played in the webpage in the embodiment generally refers to multimedia data, wherein the multimedia data may include various types of data such as a video or an audio which may be played on terminal equipment through the webpage.

Step 502: the player stores the received playing requests into a buffering queue to queue according to a receiving sequence of the playing requests.

Wherein the buffering queue is independent of the webpage loaded by an embedded browser. When there are at least two playing requests initiated by the player embedded in the webpage, the received playing requests are stored into the buffering queue for queue waiting according to the receiving sequence of the at least two playing requests, and corresponding connections are allocated to the playing requests in a way of first queuing-waiting first allocation.

Step 503: the player allocates connections to the playing requests in the buffering queue according to an upper limit of the number of concurrent connections usable for the buffering queue and the receiving sequence.

In the embodiment of the disclosure, the connections allocated to the playing requests in the buffering queue are used for the player to request to-be-played media data.

Herein, the number of the concurrent connections usable for the buffering queue may be used for representing the number of connections used which may be simultaneously used by the buffering queue, generally, when the upper limit of the number of the concurrent connections of the buffering queue is not reached, each playing request may be allocated with one connection so as to request the media data from a server. Wherein the number of the concurrent connections may be determined according to the demand of a user for the performances of services in the webpage, for example, when the user has relatively high delay tolerances to other services (such as non-video playing or webpage browsing) in the webpage, the value of the number of the configurable concurrent connections is larger than that when the delay tolerances of some services are relatively low.

In the embodiment of the disclosure, step 503 in which the player allocates the connections to the playing requests in the buffering queue according to the upper limit of the number of concurrent connections usable for the buffering queue and the receiving sequence may be implemented by adopting the following way: when the connections allocated to the received playing requests are below the upper limit of the number of the concurrent connections, the connections are sequentially allocated to the playing requests in the buffering queue according to the receiving sequence until the number of the allocated connections reaches the upper limit of the number of the concurrent connections.

For example, it is assumed that the upper limit of the number of the concurrent connections usable for the buffering queue is 4 and the number of the playing requests stored in the buffering queue for queuing and waiting to be allocated with the connections is 3, if the three playing requests initiated by the player embedded in the webpage are respectively a playing request 1, a playing request 2 and a playing request 3, and the three playing requests are sequentially received according to the receiving sequence: the playing request 1, the playing request 2 and the playing request 3, in other words, firstly, the playing request 1 is stored in the buffering queue, then, the playing request 2 is stored in the buffering queue, and finally, the playing request 3 is stored in the buffering queue. At the moment, whether the number of the connections allocated to the received playing requests reaches the upper limit of the number of the concurrent connections usable for the buffering queue or not is detected, obviously, 3 is smaller than 4, namely it is determined that the number of the connections allocated to the received playing requests does not reach the upper limit of the number of the concurrent connections, and therefore, the strategy of first queuing-waiting first allocation is adopted in the embodiment of the disclosure, according to the receiving sequence of the three playing requests, firstly, a connection 1 is allocated to the playing request 1 in the buffering queue, then, a connection 2 is allocated to the playing request 2 in the buffering queue, finally, a connection 3 is allocated to the playing request 3, and thus, the operation that the corresponding connections are allocated to all the playing requests stored in the buffering queue may be completed.

In the embodiment of the disclosure, step 503 in which the player allocates the connections to the playing requests in the buffering queue according to the upper limit of the number of concurrent connections usable for the buffering queue and the receiving sequence may be implemented by adopting the following way: when the connections allocated to the received playing requests reach the upper limit of the number of the concurrent connections, the playing requests releasing the connections in the buffering queue are eliminated, and the corresponding connections are allocated to the playing requests in the buffering queue according to the receiving sequence until the number of the allocated connections reaches the upper limit of the number of the concurrent connections.

For example, it is assumed that the upper limit of the number of the concurrent connections usable for the buffering queue is 3 and the number of the playing requests stored in the buffering queue for queuing and waiting to be allocated with the connections is 5, if the five playing requests initiated by the player embedded in the webpage are respectively a playing request 1, a playing request 2, a playing request 3, a playing request 4 and a playing request 5, and the five playing requests are sequentially received according to the receiving sequence: the playing request 1, the playing request 2, the playing request 3, the playing request 4 and the playing request 5, in other words, firstly, the playing request 1 is stored in the buffering queue, then, the playing request 2, the playing request 3 and the playing request 4 are sequentially stored in the buffering queue, and finally, the playing request 5 is stored in the buffering queue. At the moment, whether the number of the connections allocated to the received playing requests reaches the upper limit of the number of the concurrent connections usable for the buffering queue or not is detected, obviously, 5 is smaller than 3, namely it is determined that the number of the connections allocated to the received playing requests exceeds the upper limit of the set number of the concurrent connections, if related technical solutions are adopted, the upper limit of the number of the concurrent connections may not meet the requirement that the corresponding corrections are allocated to all the playing requests, but only the connections are allocated to the playing request 1, the playing request 2 and the playing request 3, and therefore, the problems that the webpage cannot respond and some media data may not be played are caused.

Due to the adoption of the technical solution provided by the embodiment of the disclosure, if it is monitored that the playing request 1 releasing the connection 1 exists in the buffering queue when it is determined that the number of the connections allocated to the received playing requests reaches the upper limit of the number of the concurrent connections, at the moment, the playing request 1 releasing the connection 1 in the buffering queue may be eliminated, so that an idle connection is obtained, and furthermore, idle connections are allocated to the playing request 4 and the playing request 5 queuing for waiting in the buffering queue; the strategy of first queuing-waiting first allocation is adopted in the embodiment of the disclosure, according to the receiving sequence of the playing request 4 and the playing request 5, at the moment, the connection may only be allocated to the playing request 4 until the number of the allocated connections reaches the upper limit of the number of the concurrent connections, and the buffering queue is further monitored in real time; while the playing request 5 will continue to wait until an idle connection is obtained again in the buffering queue, and then, the corresponding connection is allocated to the playing request 5.

In the embodiment of the disclosure, the upper limit of the number of the concurrent connections is statically configured in the player through an attribute open interface; wherein the number of the concurrent connections is smaller than the upper limit of the number of the concurrent connections of the webpage.

Herein, the upper limit of the number of the concurrent connections has a static configuration attribute. The upper limit of the number of the concurrent connections is statically configured through an open interface in the player. Specifically speaking, the upper limit of the number of the concurrent connections may be statically configured by a development side of the player or a service side operating a video through the attribute open interface. In the embodiment of the disclosure, the upper limit of the number of the concurrent connections usable for the buffering queue is greater than or equal to 2 and is smaller than or equal to the number of concurrent playing windows in the webpage.

It should be pointed that the upper limit of the number of the concurrent connections is adaptively configured according to the demands of the concurrent playing windows in the webpage. In the embodiment of the disclosure, the minimum value of the upper limit of the number of the concurrent connections is set to 2 instead of 1 mainly because the situation that two playing windows simultaneously perform playing may exist in the webpage, compared with the situation that the minimum value of the upper limit of the number of the concurrent connections is 1, setting the minimum value of the upper limit of the number of the concurrent connections to 2 may avoid the situation that the playing window playing later is not responding (due to existence of only one connection) and needs waiting, and furthermore, the two playing windows have real-time response performances.

Herein, the upper limit of the number of the concurrent connections usable for the buffering queue may be preset, wherein the upper limit of the number of the concurrent connections may be set according to the allocation standard of the number of the connections of an operating system or set according to the upper limit of the number of the concurrent connections, received by the player, of the browser; of course, the upper limit of the number of the concurrent connections may also be autonomously set by the player, for example, the upper limit of the number of the concurrent connections is set according to feature parameters of host equipment or set according to network parameters of the webpage. The solution in which the player performs setting according to the feature parameters of the host equipment is illustrated below: firstly, the feature parameters of the host equipment of the player are detected; and then, the upper limit of the number of the concurrent connections adapted to the performance of the host equipment is dynamically determined according to the feature parameters.

Herein, the upper limit of the number of the concurrent connections has an attribute dynamically and adaptively adjusted according to the feature parameters of the host equipment of the player, namely the upper limit of the number of the concurrent connections has dynamic adaptive adjustment property. Wherein dynamically determining the upper limit of the number of the concurrent connections adapted to the performance of the host equipment according to the feature parameters may be implemented by adopting the following way: the upper limit of the number of the concurrent connections adapted to a variation range is determined when the variations of the feature parameters meet variation conditions.

For example, when variations of the feature parameters of the host equipment of the player are detected to have obvious jitters, the upper limit of the number of the concurrent connections usable for the buffering queue is adaptively reduced according to a jittering range; and when the variations of the feature parameters of the host equipment of the player are detected to be obviously improved, the upper limit of the number of the concurrent connections usable for the buffering queue is adaptively increased according to the improved quantization range.

Herein, for an implementation way of increasing or reducing the upper limit of the number of the concurrent connections, the upper limit of the number of the concurrent connections may be reduced or increased in an equal proportion or an unequal proportion, but the embodiment of the disclosure is not specifically limited thereto.

An implementation way of increasing or reducing the upper limit of the number of the concurrent connections in the equal proportion is described below by taking a stepped way by which the upper limit of the number of the concurrent connections is adjusted as an example. It is assumed that the initial value of the upper limit of the number of the concurrent connections usable for the buffering queue is 8, the initial value of the upper limit of the number of the concurrent connections is reduced by one value in the equal proportion every time when the jittering range of the preset feature parameters varies once, when the variations of the feature parameters of the host equipment of the player are detected to have obvious jitters and the jittering range is changed from 5 to 3, the jittering range of the feature parameters varies twice, and accordingly, the initial value of the upper limit of the number of the concurrent connections may be reduced from 8 to 6. The initial value of the upper limit of the number of the concurrent connections is increased by one value in the equal proportion every time when the improved quantization range of the preset feature parameters varies once, when the variations of the feature parameters of the host equipment of the player are detected to be obviously improved and the improved quantization range is changed from 2 to 5, the improved quantization range of the feature parameters varies three times, and thus, the initial value of the upper limit of the number of the concurrent connections may be increased from 8 to 11.

In the embodiment of the disclosure, the solution in which the player performs setting according to the network parameters of the webpage may be implemented by adopting the following way: the network parameters of the webpage are detected, and the upper limit of the number of the concurrent connections is dynamically determined according to the network parameters. In other words, the upper limit of the number of the concurrent connections with the dynamic adaptive adjustment property may also be set according to the network parameters of the webpage. Wherein the network parameters may include network bandwidth usable for the browser and network delay of the playing requests.

Herein, with the network parameters being the network bandwidth usable for the browser as an example, the delay of retrieving the media data is relatively small when the network bandwidth is relatively large, and therefore, the upper limit of the number of the concurrent connections, smaller than that during relatively small bandwidth, may be configured at the moment, namely the network bandwidth is in negative correlation with the upper limit of the number of the concurrent connections, in other words, the larger the network bandwidth is, the smaller the upper limit of the number of the concurrent connections is; and the smaller the network bandwidth is, the larger the upper limit of the number of the concurrent connections is.

Due to the adoption of the technical solution of the embodiment of the disclosure, when media playing is performed in the webpage, the playing requests of the player are stored in the buffering queue to queue, and the corresponding connections are allocated to the playing requests in the buffering queue according to the upper limit of the number of the concurrent connections usable for the buffering queue and the receiving sequence of the playing requests. Thus, the real-time response performance of the webpage in which the player is embedded may be effectively improved when a plurality of playing windows exists in the same page in the webpage.

Figure 7:
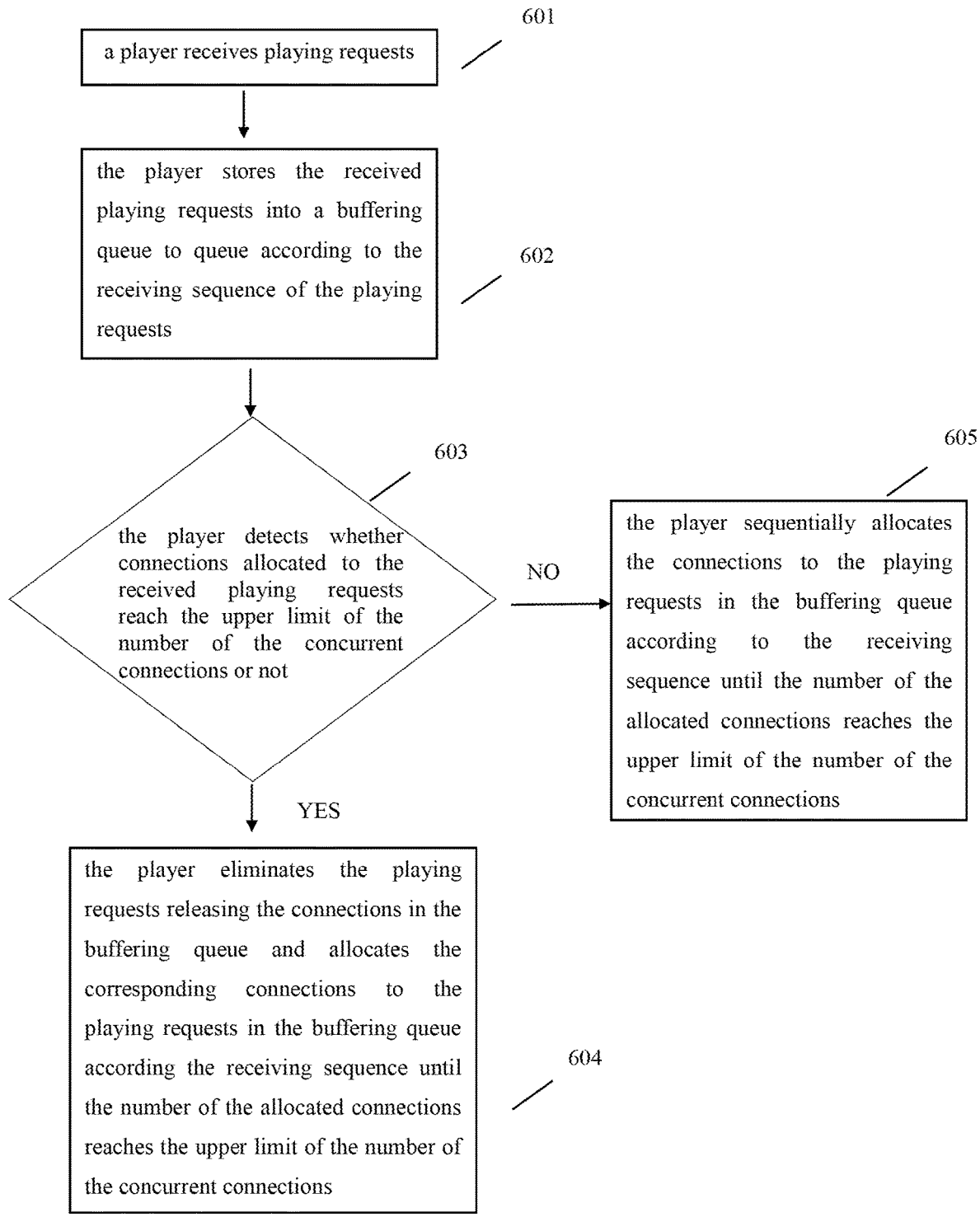
FIG. 7 is another optional implementation process schematic diagram of the connection allocation method in the media playing process provided by the embodiment of the disclosure.

FIG. 7 is another optional implementation process schematic diagram of the connection allocation method in the media playing process, provided by the embodiment of the disclosure, the connection allocation method in the media playing process may be applied to various types of players such as an H5 player embedded into a webpage loaded by a browser or an application program for playing a media file; as shown in FIG. 7, the specific implementation process of the connection allocation method in the media playing method in the embodiment of the disclosure will be described in conjunction with steps as shown in FIG. 7.

Step 601: a player receives playing requests.

Step 602: the player stores the received playing requests into a buffering queue to queue according to the receiving sequence of the playing requests.

Step 603: the player detects whether connections allocated to the received playing requests reach the upper limit of the number of the concurrent connections or not, when the connections allocated to the received playing requests are determined to reach the upper limit of the number of the concurrent connections, step 604 is performed, or else, step 605 is performed.

In the embodiment of the disclosure, the upper limit of the number of the concurrent connections usable for the buffering queue is greater than or equal to 2 or smaller than or equal to the number of concurrent playing windows in the webpage.

The upper limit of the number of the concurrent connections usable for the buffering queue may be preset, wherein the upper limit of the number of the concurrent connections usable for the buffering queue may be set according to the allocation standard of the number of the connections of an operating system or set according to the upper limit of the number of the concurrent connections, received by the player, of the browser; of course, the upper limit of the number of the concurrent connections may also be autonomously set by the player, for example, the upper limit of the number of the concurrent connections is set according to feature parameters of host equipment.

Setting the upper limit of the number of the concurrent connections by the player according to the feature parameters of the host equipment may be implemented by adopting the following way: the feature parameters of the host equipment of the player are detected; and the upper limit of the number of the concurrent connections adapted to the performance of the host equipment is dynamically determined according to the feature parameters.

Wherein the solution in which the upper limit of the number of the concurrent connections adapted to the performance of the host equipment is dynamically determined according to the feature parameters may be implemented by adopting the following way: the upper limit of the number of the concurrent connections adapted to a variation range is determined when the variations of the feature parameters meet variation conditions.

For example, when the variations of the feature parameters of the host equipment of the player are detected to have obvious jitters, the upper limit of the number of the concurrent connections usable for the buffering queue is adaptively reduced according to a jittering range; and when the variations of the feature parameters of the host equipment of the player are detected to be obviously improved, the upper limit of the number of the concurrent connections usable for the buffering queue is adaptively increased according to the improved quantization range.

In the embodiment of the disclosure, the upper limit of the number of the concurrent connections may also be set by the player according to network parameters of the webpage. Specifically speaking, the network parameters of the webpage are detected, and the upper limit of the number of the concurrent connections is dynamically determined according to the network parameters. Wherein the network parameters may include network bandwidth usable for the browser and network delay of the playing requests.

With the network parameters being the network bandwidth as an example, the delay of retrieving the media data is relatively small when the network bandwidth is relatively large, and therefore, the upper limit of the number of the concurrent connections, smaller than that during relatively small bandwidth, may be configured at the moment, namely the network bandwidth is in negative correlation with the upper limit of the number of the concurrent connections, in other words, the larger the network bandwidth is, the smaller the upper limit of the number of the concurrent connections is; and the smaller the network bandwidth is, the larger the upper limit of the number of the concurrent connections is.

Step 604: the player eliminates the playing requests releasing the connections in the buffering queue and allocates the corresponding connections to the playing requests in the buffering queue according the receiving sequence until the number of the allocated connections reaches the upper limit of the number of the concurrent connections.

Herein, when the number of the connections allocated to the received playing requests reaches the upper limit of the concurrent connections, the playing requests to which the connections are not allocated may be still stored in the buffering queue, the requests need to wait for idle connections, and therefore, whether the situation that the playing requests release the connections exists in the buffering queue or not needs to be monitored in real time, when being monitored to exist in the buffering queue, the playing requests releasing the connections in the buffering queue may be eliminated, so that the idle connections are obtained, and furthermore, the idle connections are allocated to the playing requests queuing and waiting in the buffering queue by adopting the strategy of first queuing-waiting first allocation until the number of the allocated connections reaches the upper limit of the number of the concurrent connections, and the buffering queue is further monitored in real time.

Step 605: the player sequentially allocates the connections to the playing requests in the buffering queue according to the receiving sequence until the number of the allocated connections reaches the upper limit of the number of the concurrent connections.

Herein, the corresponding connections may be allocated to all the playing requests stored in the buffering queue according to the receiving sequence of the playing requests by adopting the strategy of first queuing-waiting first allocation until the number of the allocated connections reaches the upper limit of the number of the concurrent connections.

It should be noted that the media file recorded by the embodiment of the disclosure may be of a stream media format or a non-stream media format.

In one embodiment, for the situation that the media file is a stream media file, the playing requests are used for requesting fragment media files within a given time interval (used for following a real-time playing point of the player) from a server, the fragment media files are transmitted to media elements in the webpage through a media resource expansion interface in the webpage so as to be decoded, and furthermore, the continuous playing of the media file is realized.

As an example, the given time interval is a preloading duration posterior to the playing point and is used for preloading parts of media files posterior to the playing point to realize smooth watching experience. The length of the given time interval may be adapted by the player and the network parameters or the feature parameters of the host equipment, so that the optimal utilization of a terminal resource and/or a network resource is realized.

As an example, the given time interval may also be the length of at least one content unit posterior to the playing point, wherein the content unit is formed according to the division of characters, scenes and plots in the media file and is used for representing the variation of contents in the media file, so that the phenomenon that the given time interval is skipped by a user to consume unnecessary flow is avoided to the maximum extent.

In one embodiment, for the situation that the media file is a non-stream media file, the player determines two key frames (the time interval defined between decodes of the key frames forms the given time interval or includes the given time interval) corresponding to the given time interval in the media file by determining the given time interval for following the real-time playing point in the media file, then, requests media data between the two key frames from the server, therefore, the fragment media files which may be independently decoded to be played are constructed and are transmitted to the media elements in the webpage through the media resource expansion interface in the webpage so as to be decoded, and furthermore, the continuous playing of the media file is realized.

Wherein the time corresponding to the playing point is a time dimension relative to a media time coordinate system (the time of starting to play the media file is used as a time origin), and the length of the given time interval is smaller than the length of the media file, such as 5% of the predetermined proportion of the length of the media file or a set length such as 10 min.

The way of determining the corresponding two key frames in the media file according to the given time interval is further described below.

The decoding time of the two key frames is a time interval of endpoints and includes the given time interval, the media data between the two key frames is used as media data corresponding to the given time interval, the fragment media files are constructed to be played, and the given time interval is used for following the real-time playing point of the player, so that the continuous playing of the media file is realized.

The playing point may be a playing moment reached by adopting a way of continuously playing the media file (namely natural playing without interference from the user), such as a playing point from 30th min to 40th min; or the playing point may be a playing moment reached by the media file in a skip way (namely page skip realized by clicking a progress bar by the user by virtue of a cursor), for example, the original playing point is 20% of the playing progress, and the skipped playing point is 30% of the playing progress.

In one embodiment, with specific to the situation that the playing point is the playing moment reached in a way of continuously playing the media file, an implementation way of determining the two key frames (set as a first key frame and a second key frame of which the decoding time is posterior to that of the first key frame) is described according to the situation that a video frame corresponding to the playing point and a video frame corresponding to an ending time of the given time interval are common frames or key frames.

Situation 1) the video frame corresponding to the playing point is the common frame, the player takes the media data between the two key frames as a basic playing loading unit, and therefore, the media data before the first key frame (the key frame closest to the playing point in the key frames of which the decoding time is posterior to the playing point) posterior to the playing point is loaded media data, in order to avoid repeatedly acquiring the part of loaded media data, the first key frame in the two key frames of the given time interval is the first key frame of which the decoding time is posterior to the playing point in the media file.

Situation 2) the video frame corresponding to the playing point is the key frame, and the first key frame in the two key frames of the given time interval is the key frame corresponding to the playing point, namely the key frame aligned to the starting time of the given time interval.

Situation 3) if the video frame corresponding to the ending time of the given time interval is the common frame, the player takes the media data between the two key frames as the basic playing loading unit, and therefore, the acquisition of the media data between the key frame and the video frame corresponding to the ending time may be leaked if the key frame anterior to the ending time is used as the second key frame of the given time interval, then, frame skip may be caused by incapability of playing the media data between the key frame anterior to the ending time and the video frame corresponding to the ending time when the media file is played, and therefore, in order to ensure that the video frame corresponding to the ending time of the given time interval may be normally played without frame skip, the second key frame in the two key frames of the given time interval is the key frame closest to the ending time in the key frames of which the decoding time is posterior to the ending time of the given time interval.

Situation 4) the video frame corresponding to the ending time of the given time interval is the key frame, and the second key frame in the two key frames of the given time interval is the second key frame of which the decoding time is aligned to the ending time of the given time interval, namely the key frame aligned to the ending time of the given time interval.

In the situations 1) and 3), the key frame across the playing point is used as an end point of the media data of the given time interval, so that it is ensured that the video frame corresponding to the playing point has sufficient information for correct decoding, and the situation of frame skip caused by insufficiency of decoding data (namely the key frame) may not appear.

In the situations 2) and 4), with specific to the situation that the playing point is aligned to the key frame, the aligned key frame is directly used as the end point of the media data of the given time interval, so that the situation that redundant data is requested is reduced to the maximum extent, and the situation that the non-media playing service in the webpage is delayed due to the occupation of the connections and flow is avoided.

In the other embodiment, with specific to the situation that the playing point is the playing moment reached in a skip way, an implementation way of determining the two key frames (set as a first key frame and a second key frame of which the decoding time is posterior to that of the first key frame) is described according to the situation that a video frame corresponding to the playing point and a video frame corresponding to an ending time of the given time interval are common frames or key frames.

Situation 1) the video frame corresponding to the playing point is the common frame, the playing point is reached by skipping, and therefore, the media data between the first key frame anterior to the playing point and the playing point is not loaded, the first key frame is the first key frame of which the decoding time is anterior to the playing point in the media file, namely the key frame of which the decoding time is earlier than and closest to the starting time of the given time interval and which is found from the time (namely a corresponding relation between a serial number represented by media information and the decoding time of the frame) of the media data.

By additionally requesting the media data between the playing point and the key frame anterior to the playing point, normal decoding may be guaranteed no matter which playing point is skipped, and the situation of frame skip caused by incapability of decoding when the playing point corresponds to the common frame may be avoided.

Situation 2) the video frame corresponding to the playing point is the key frame, and the first key frame is the key frame corresponding to the playing point, namely the key frame of which the decoding time is aligned to the starting time of the given time interval and which is found from the time (namely the corresponding relation between the serial number represented by the media information and the decoding time of the frame) of the media data.

Situation 3) the video frame corresponding to the ending time of the given time interval is the common frame, and the second key frame is the key frame of which the decoding time is posterior to and closest to the ending time of the given time interval.

In the situations 1) and 3), the key frame across the playing point is used as an end point of the media data of the given time interval, so that it is ensured that the video frame corresponding to the playing point has sufficient information for correct decoding, and the situation of frame skip caused by insufficiency of decoding data (namely the key frame) may not appear.

Situation 4) the video frame corresponding to the ending time of the given time interval is the key frame, and the second key frame is the key frame of which the decoding time is aligned to the ending time of the given time interval.

In the situations 2) and 4), media data to be acquired is defined by the key frame aligned to the playing point, so that the situation of acquiring unnecessary media data is reduced to the maximum extent and the occupation of the connections and flow is reduction on the premise that the playing point may be correctly decoded, and furthermore, the real-time property of the non-media playing service in the webpage is guaranteed.

An implementation way of encapsulating the fragment media files according to the media data is described below, firstly, the media data and metadata corresponding to the media data are encapsulated into corresponding fragment media files; and then, the fragment media files are transmitted to the media elements in the webpage through the media resource expansion interface so as to be played.

Figure 8:
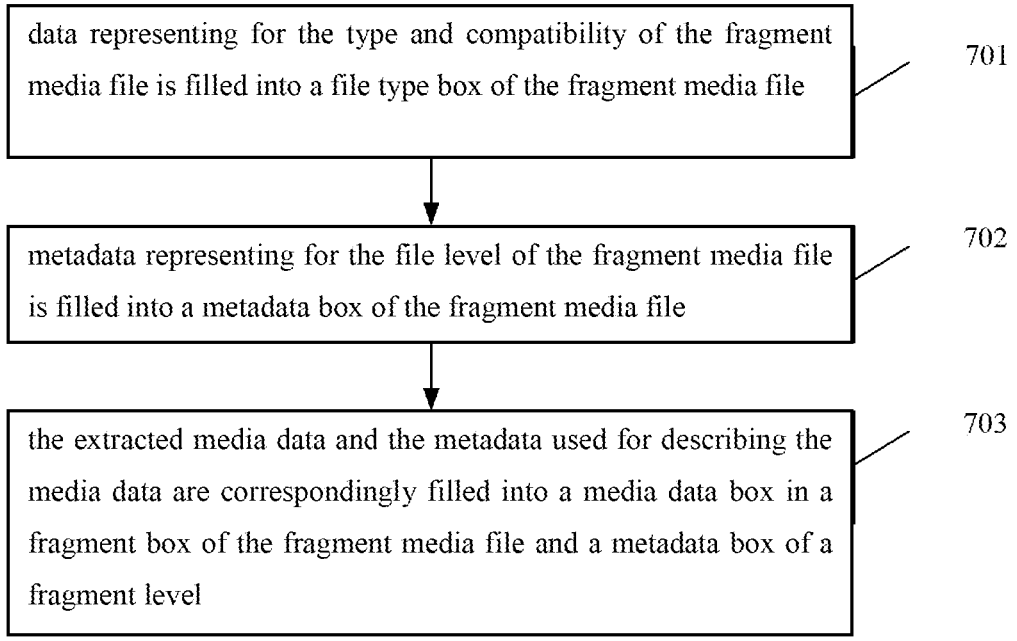
FIG. 8 is an optional implementation process schematic diagram of an encapsulated fragment media file provided by the embodiment of the disclosure.

In one embodiment, the player is encapsulated into the corresponding fragment media files in such a way: the media data corresponding to the given time interval in the media file is acquired from the server, wherein the given time interval is used for following the playing point, and the media data and the metadata describing the media data are encapsulated according to encapsulating structures of the fragment media files to form fragment media files which may be independently decoded by the media elements in the webpage, and the description is further performed in conjunction with FIG. 8.

Referring to FIG. 8 which is an optional implementation process schematic diagram of an encapsulated fragment media file provided by the embodiment of the disclosure, FIG. 8 will be described in conjunction with steps as shown in FIG. 8.

Step 701: data representing for the type and compatibility of the fragment media file is filled into a file type box of the fragment media file.

For example, with an FMP4 file encapsulated to form an encapsulating structure as shown in FIG. 4 as an example, the head of the file type box, namely ftyp box, of the FMP4 file is filled with the type and length (representing for the overall length of the ftyp box) of the box, and a data part of the ftyp box is filled with data (binary data) generating the file type of FMP4 and a compatibility protocol.

Step 702: metadata representing for the file level of the fragment media file is filled into a metadata box of the fragment media file.

In one embodiment, the metadata used for describing the media data and required for filling a nested structure is calculated according to the media data to be filled into the encapsulating structure of the fragment media file and the nested structure of the metadata box in the fragment media file.

With FIG. 4 as an example again, the metadata representing for the file level of the FMP4 file is calculated and is filled into a metadata box (namely moov box) of FMP4, and three boxes including mvhd, track and mvex (movie extend) are nested in the moov box.

Step 703: the extracted media data and the metadata used for describing the media data are correspondingly filled into a media data box in a fragment box of the fragment media file and a metadata box of a fragment level.

In one embodiment, one or more fragments may be encapsulated in a fragment media file, to-be-filled media data may be filled into a media data box (namely mdat box) of one or more fragments of the fragment media file, and a metadata box (recorded as moof box) of the fragment level is encapsulated in each fragment, wherein the filled metadata is used for describing the media data filled into the fragments, so that the fragments may be independently decoded.

By conjunction with FIG. 4, with the situation that the to-be-filled media data is filled into two fragments of the encapsulating structure of the FMP4 file as an example, the to-be-filled media data is filled into each fragment; the metadata required to be filled into the metadata box (namely the moof box) of the fragment level of the corresponding fragment is calculated and is correspondingly filled into sub-boxes nested in the moof box, wherein the head of the moof box is called moof box, and the filled binary data is used for representing for the type, namely the moof box, of the box and the length of the moof box.

In one embodiment in which the data is filled into the corresponding boxes in steps 701 to 703, when filling operation is performed, a writing operation function of a class is called to complete the writing-in and mergence of the binary data in memory buffering zones of the sub-boxes and return an example of the class, and the returned example is used for merging the sub-boxes and sub-boxes among which a nesting relationship exists.

As an example of filling data, a class MP4 for realizing an encapsulating function and a static method for encapsulating each sub-box in the fragment media file into a class Stream are established; a class (recorded as Stream) for realizing a binary data operation function is established, and each class Stream is provided with a memory buffering zone for storing to-be-filled binary data; to-be-filled multibyte decimal data is converted into the binary data by using the static method provided by the Stream; the mergence and filling of the binary data to be filled to the sub-boxes are completed in the memory buffering zone by virtue of a writing operation function provided by an example of the class Stream; and a novel Stream example is returned by using the static method provided by the Stream, so that the mergence of the current sub-box with other sub-boxes among which the nesting relationship exists.

The process that the fragment media file is transmitted to the media elements in the webpage by the player through the media resource expansion interface in the webpage so as to be decoded and played is further described below.

Figure 9:
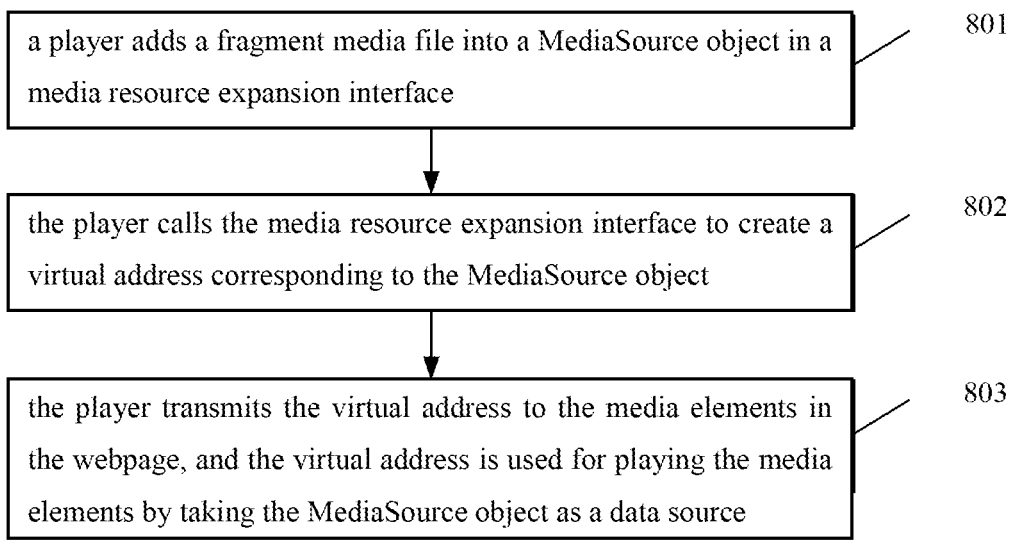
FIG. 9 is a process schematic diagram that a fragment media file is transmitted to a media element in a webpage by a player provided by the embodiment of the disclosure through a media resource expansion interface in the webpage so as to be decoded and played.

Referring to FIG. 9 which is a process schematic diagram that a fragment media file is transmitted to a media element of a webpage by a player provided by the embodiment of the disclosure through a media resource expansion interface in the webpage so as to be decoded and played, FIG. 9 will be described in conjunction with steps as shown in FIG. 9.

Step 801: a player adds a fragment media file into a media source object in a media resource expansion interface.

Figure 10:
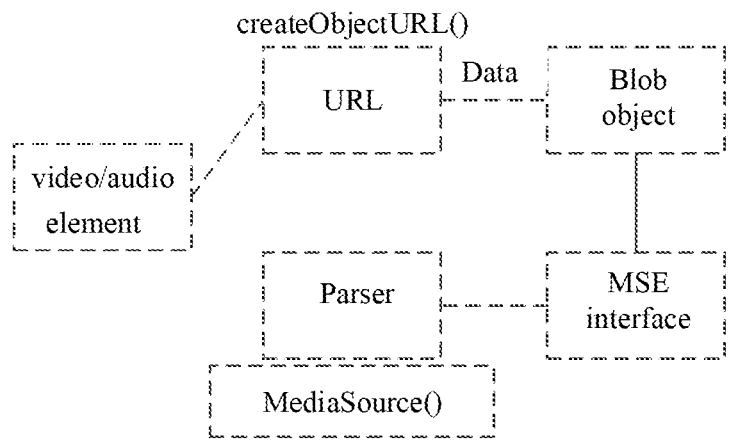
FIG. 10 is an optional schematic diagram that the fragment media file is played by the player provided by the embodiment of the disclosure through the media resource expansion interface.

Referring to FIG. 10 which is an optional schematic diagram that the fragment media file is played by the player provided by the embodiment of the disclosure through the media resource expansion interface, when the player receives a playing event of a media file from a playing window (the playing window corresponding to the player) in the webpage, the player creates a Media Source object by executing a MediaSource method encapsulated in the media resource expansion interface; a cache of the MediaSource object, namely a SourceBuffer object, is created by executing an addSourceBuffer method encapsulated in the media resource expansion interface, one MediaSource object owns one or more SourceBuffer objects, and each SourceBuffer object may be used for corresponding to one playing window in the webpage and is used for receiving a to-be-played fragment media file in the window.

In a process of playing the media files, a parser in the player continuously constructs novel fragment media files by parsing newly acquired media data, the fragment media files are added into the SourceBuffer object of the same MediaSource object by executing an appendBuffer method of the SourceBuffer object.

Step 802: the player calls the media resource expansion interface to create a virtual address corresponding to the MediaSource object.

For example, the player executes a createObjectURL method encapsulated in the media resource expansion interface to create the virtual address corresponding to the MediaSource object, namely a virtual URL in which a fragment media file with a Blob type is encapsulated.

In addition, the player sets the MediaSource object as a source (src) attribute of the virtual URL, namely the virtual URL is bound with a media element such as a video/audio in the webpage, and the process is also called relating the MediaSource object to the media element in the webpage.

Step 803: the player transmits the virtual address to the media elements in the webpage, and the virtual address is used for playing the media elements by taking the MediaSource object as a data source.

For example, the player includes statements for calling the media element to play the virtual URL, such as <audio> virtual URL. When a browser explains the corresponding statements embedded into the player in the webpage, the media element of the browser reads the fragment media file from the SourceBuffer object bound with the virtual URL by and decode and play the fragment media file.

Below, the process that the player converts the MP4 file into the FMP4 file and plays the FMP4 file in the webpage by virtue of the media resource expansion interface is described.

Figure 11:
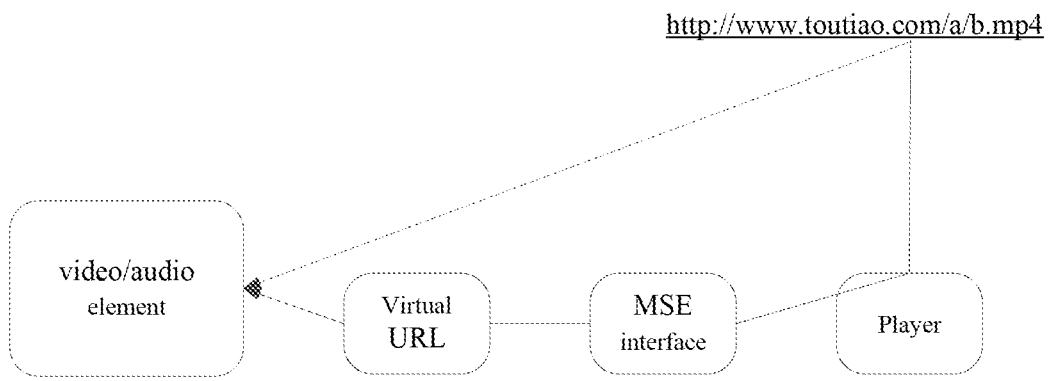
FIG. 11 is a schematic diagram that the MP4 file provided by the embodiment of the disclosure is converted into the FMP4 file and is played through the media resource expansion interface.

Referring to FIG. 11 which is a schematic diagram that the MP4 file provided by the embodiment of the disclosure is converted into the FMP4 file and is played through the media resource expansion interface, the player requests to acquire parts of media data in the MP4 file from the server based on a true address (http://www.toutiao.com/a/b.mp4) of the media file, such as data of which the decoding time is within the given time interval for following the playing point.

The player constructs the FMP4 file based on the acquired media data, and then, adds the FMP4 file into the SourceBuffer object corresponding to the MediaSource object, the virtual URL is bound to the MediaSource object, and therefore, the continuously added novel FMP4 file is read from the SourceBuffer object of the MediaSource object and is decoded by the audio/video element when the operation that the player calls a code of the audio/video element is executed, and the continuous playing of the media file is realized.

Due to the adoption of the technical solution of the embodiment of the disclosure, when media playing is performed in the webpage, the playing requests of the player are stored in the buffering queue to queue, and the corresponding connections are allocated to the playing requests in the buffering queue according to the upper limit of the number of the concurrent connections usable for the buffering queue and the receiving sequence of the playing requests. Thus, the real-time response performance of the webpage in which the player is embedded may be effectively improved when a plurality of playing windows exists in the same page in the webpage.

Figure 12:
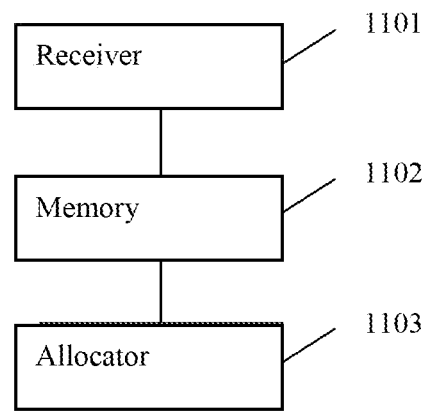
FIG. 12 is one optional functional structure schematic diagram of a media playing device provided by the embodiment of the disclosure.

In order to achieve the connection allocation method in the media playing process, the embodiment of the disclosure further provides a media playing device, the media playing device may be used for operating various types of players such as an H5 player embedded into a webpage loaded by a browser or an application program for playing a media file, and FIG. 12 is an optional functional structure schematic diagram of a media playing device provided by the embodiment of the disclosure; and as shown in FIG. 12, the media playing device includes a receiver 1101, a memory 1102 and an allocator 1103. Each module is described in detail below.

The receiver 1101 is configured to receive playing requests initiated by a player embedded in a webpage, wherein the player plays media data in the webpage.

The memory 1102 is configured to store the received playing requests into a buffering queue to queue according to a receiving sequence of the playing request.

The allocator 1103 is configured to allocate connections to the playing requests in the buffering queue according to the upper limit of the number of the concurrent connections usable for the buffering queue and the receiving sequence.

In the embodiment of the disclosure, the connections are used for the player to request to-be-played media data. The player may be displayed in a playing window of the webpage in an embedded way, namely the playing requests are initiated by the player embedded in the webpage. Wherein the player may perform concurrent playing through a plurality of concurrent playing windows in the webpage when playing a plurality of media files in the webpage; and the media data played in the webpage may include various types of data such as a video and an audio which may be played on terminal equipment by the webpage.

In the embodiment of the disclosure, the process that the allocator 1103 allocates the connections to the playing requests in the buffering queue according to the upper limit of the number of concurrent connections usable for the buffering queue and the receiving sequence may be implemented by adopting the following way: when the connections allocated to the received playing requests are below the upper limit of the number of the concurrent connections, the connections are sequentially allocated to the playing requests in the buffering queue according to the receiving sequence until the number of the allocated connections reaches the upper limit of the number of the concurrent connections.

In the embodiment of the disclosure, the process that the allocator 1103 allocates the connections to the playing requests in the buffering queue according to the upper limit of the number of concurrent connections usable for the buffering queue and the receiving sequence may also be implemented by adopting the following way: when the connections allocated to the received playing requests reach the upper limit of the number of the concurrent connections, the playing requests releasing the connections in the buffering queue are eliminated, and the corresponding connections are allocated to the playing requests in the buffering queue according to the receiving sequence until the number of the allocated connections reaches the upper limit of the number of the concurrent connections.

Herein, the upper limit of the number of the concurrent connections is statically configured in the player through an attribute open interface; wherein the number of the concurrent connections is smaller than the upper limit of the number of the concurrent connections of the webpage.

For example, the upper limit of the number of the concurrent connections is statically configured through an open interface in the player, specifically speaking, the upper limit of the number of the concurrent connections may be statically configured by a development side of the player or a service side operating a video through the attribute open interface.

Herein, the upper limit of the number of the concurrent connections usable for the buffering queue is larger than or equal to 2 and is smaller than or equal to the number of concurrent playing windows in the webpage.

Herein, the upper limit of the number of the concurrent connections usable for the buffering queue may be preset, wherein the upper limit of the number of the concurrent connections usable for the buffering queue may be set according to the allocation standard of the number of the connections of an operating system or set according to the upper limit of the number of the concurrent connections, received by the player, of the browser; of course, the upper limit of the number of the concurrent connections may also be autonomously set by the player, for example, the upper limit of the number of the concurrent connections may be set according to feature parameters of host equipment or set by the player according to network parameters of the webpage.

Figure 13:
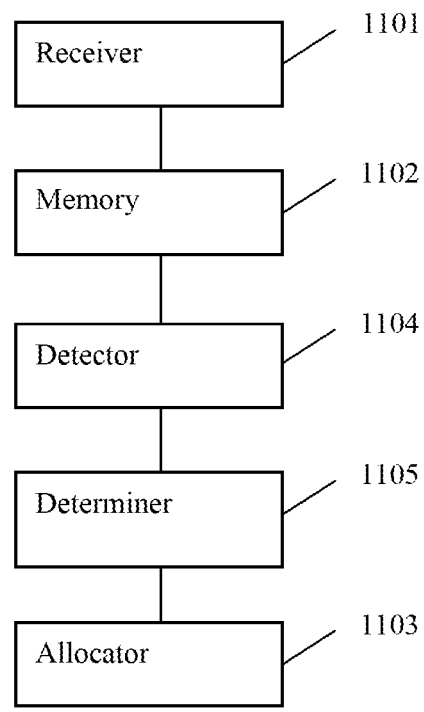
FIG. 13 is another optional functional structure schematic diagram of the media playing device provided by the embodiment of the disclosure.

The solution in which the upper limit of the number of the concurrent connections is set by the player is described below, FIG. 13 is another optional functional structure schematic diagram of the media playing device provided by the embodiment of the disclosure, as shown in FIG. 13, the media playing device may further include:

a detector 1104, configured to detect the feature parameters of the host equipment of the player;

and a determiner 1105, configured to dynamically determine the upper limit of the number of the concurrent connections adapted to the performance of the host equipment according the feature parameters.

In the embodiment of the disclosure, the process that the determiner 1105 dynamically determines the upper limit of the number of the concurrent connections adapted to the performance of the host equipment according the feature parameters may be implemented by adopting the following way: the upper limit of the number of the concurrent connections adapted to a variation range is determined when the variations of the feature parameters meet variation conditions.

For example, when variations of the feature parameters of the host equipment of the player are detected to have obvious jitters, the upper limit of the number of the concurrent connections usable for the buffering queue is adaptively reduced according to a jittering range; and when the variations of the feature parameters of the host equipment of the player are detected to be obviously improved, the upper limit of the number of the concurrent connections usable for the buffering queue is adaptively increased according to the improved quantization range.

In the embodiment, the detector 1104 is further configured to detect the network parameters of the webpage.

The determiner 1105 is further configured to dynamically determine the upper limit of the number of the concurrent connections according to the network parameters.

Wherein the network parameters may include network bandwidth usable for the browser and network delay of the playing requests.

Herein, with the network parameters being the network bandwidth as an example, the delay of retrieving the media data is relatively small when the detector 1104 detects relatively large network bandwidth, and therefore, the upper limit of the number of the concurrent connections, smaller than that during relatively small bandwidth, may be configured at the moment, namely the network bandwidth is in negative correlation with the upper limit of the number of the concurrent connections, in other words, the larger the network bandwidth is, the smaller the upper limit of the number of the concurrent connections is; and the smaller the network bandwidth is, the larger the upper limit of the number of the concurrent connections is.

It should be noted that the division of each of the program modules is only illustrated when the media playing device provided by the embodiment controls media playing of the media data, and in the actual application, the processing and allocation may be completed by the different program modules as required, namely an internal structure of the media playing device is divided into the different program modules, so that all or parts of processing described as above are completed.

In the actual application, all the memory 1102, the allocator 1103, the detector 1104 and the determiner 1105 in the modules may be implemented by a CPU (Central Processing Unit), an MPU (Micro Processor Unit), a DSP (Digital Signal Processor) or an FPGA (Field Programmable Gate Array) on the player; and the receiver 1101 in the modules may be implemented by a communication module (including a basic communication suite, an operating system, a communicator, a standardized interface, a protocol and the like) and a transceiving antenna in the actual application.

In order to implement the connection allocation method in the above media playing process, the embodiment of the present disclosure further provides a hardware structure of the media playing device. A hardware structure of a media playing device implementing an embodiment of the present disclosure may be described with reference to the accompanying drawings, which may be to run various types of players, such as embedded H5 players or applications that play media files in web pages loaded by the browser.

The hardware structure of the media playing device of the embodiment of the present disclosure is further described below. It can be understood that FIG. 14 only shows an exemplary structure of the media playing device instead of entire structure, and part or all of the structure shown in FIG. 14 may be implemented as needed.

Figure 14:
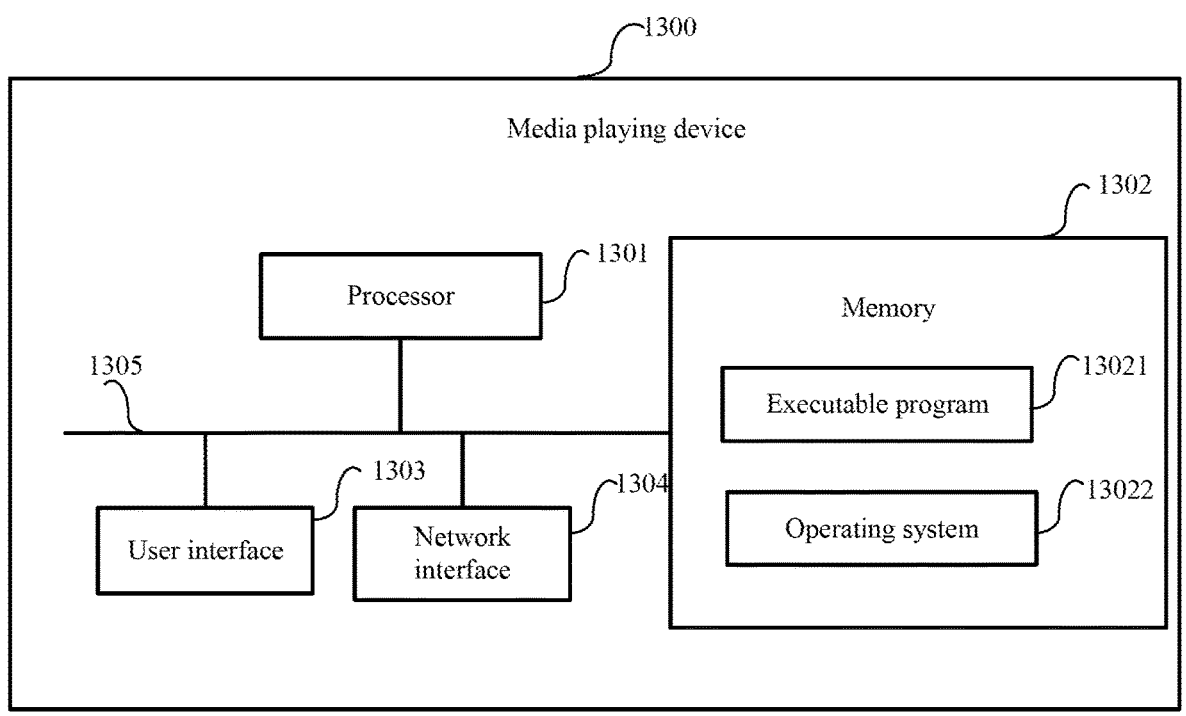
FIG. 14 is an optional hardware structure schematic diagram of the media playing device provided by the embodiment of the disclosure.

As shown in FIG. 14, FIG. 14 is a schematic diagram of an optional hardware structure of a media playing device according to an embodiment of the present disclosure. In actual applications, the device can be used in the foregoing various forms of the player. The media playing device 1300 shown in FIG. 14 may include at least one processor 1301, a memory 1302, a user interface 1303, and at least one network interface 1304. The various components in media playback device 1300 are coupled together by a bus system 1305. It will be appreciated that the bus system 1305 is used to implement connection communication between these components. The bus system 1305 can include, a power bus, a control bus, and a status signal bus, in addition to the data bus. However, for clarity of description, various buses are labeled as bus system 1305 in FIG. 14

The user interface 1303 may include a display, a keyboard, a mouse, a trackball, a click wheel, a button, a button, a touch panel, or a touch screen.

It is to be understood that the memory 1302 can be either volatile memory or non-volatile memory, and can include both volatile and nonvolatile memory.

The memory 1302 in the embodiment of the present disclosure is for storing various types of data to support the operation of the media playback apparatus 1300. Examples of such data include: any executable instructions for operating on the media playback device 1300, such as the executable program 13021 and the operating system 13022, the program for implementing the connection assignment method during media playback of embodiments of the present disclosure may be included execution program 13021.

The connection allocation method in the media playing process provided by the embodiment of the present disclosure may be applied to the processor 1301 or implemented by the processor 1301. The processor 1301 may be an integrated circuit chip with signal processing capabilities. In the implementation process, each step of the connection allocation method in the above media playing process may be completed by an integrated logic circuit of hardware in the processor 1301 or an instruction in a software form. The processor 1301 described above may be a general purpose processor, a DSP, or other programmable logic device, discrete gate or transistor logic device, discrete hardware component, or the like. The processor 1301 may implement or perform a connection allocation method, a step, and a logic block diagram in a media playing process provided in the embodiments of the present disclosure. A general purpose processor can be a microprocessor or any conventional processor or the like. The steps of the connection allocation method in the media playing process provided by the embodiments of the present disclosure may be directly implemented as completion of the hardware decoding processor, or may be performed by using a combination of hardware and software modules in the decoding processor. The software module may be located in a storage medium, and the storage medium is located in the memory 1302, the processor 1301 reads the information in the memory 1302 and completes the steps of the connection allocation method in the media playing process provided by the embodiment of the present disclosure.

In this embodiment, the media playback device that implements the embodiments of the present disclosure may also be a combination of software and hardware. The media playback device 1300 includes a memory 1302 for storing executable instructions, a processor 1301 for executing When the executable instruction is described, the connection allocation method in the media playing process provided by the embodiment of the present disclosure is implemented.

In an exemplary embodiment, an embodiment of the present disclosure further provides a storage medium, which may be a storage medium such as an optical disk, a flash memory, or a magnetic disk, and may be a non-transitory storage medium. The storage medium is stored with an executable instruction, and when the executable instruction is executed, the connection allocation method in the media playing process provided by the embodiment of the present disclosure is implemented.

In summary, the embodiments of the present disclosure have the following beneficial effects: when there are multiple play windows on the same page in the webpage, it dose not lead to a web page, such as web browsing or no response delays, and the media player window delay or no response, can effectively promote the embedded player real-time response performance of a web page because of the multiple broadcast windows on the same page.

The respective technical solutions described in the embodiments of the present disclosure may be arbitrarily combined without conflict.

The above is only the specific embodiment of the present disclosure, but the scope of the present disclosure is not limited, and any person skilled in the art can easily think of changes or substitutions within the technical scope of the disclosure, it should be covered within the scope of protection of the present disclosure. Therefore, the scope of protection of the present disclosure should be determined by the scope of the claims.

What is claimed is:

1. A connection allocation method in a media playing process, comprising:
   receiving playing requests initiated by a player embedded in a webpage, wherein the player plays media data in the webpage;
   storing the received playing requests into a buffering queue to queue according to a receiving sequence of the playing requests; and
   allocating connections to the playing requests in the buffering queue according to an upper limit of a number of concurrent connections usable for the buffering queue and the receiving sequence, wherein the upper limit of the number of the concurrent connections usable for the buffering queue is greater than or equal to 2, and is smaller than or equal to a number of concurrent playing windows in the webpage;
   wherein the connections are used for the player to request to-be-played media data.

2. The connection allocation method according to claim 1, wherein the allocating connections to the playing requests in the buffering queue according to an upper limit of the number of concurrent connections usable for the buffering queue and the receiving sequence comprises:
   when the connections allocated to the received playing requests are below the upper limit of the number of the concurrent connections,
   sequentially allocating the connections to the playing requests in the buffering queue according to the receiving sequence, until the number of the allocated connections reaches the upper limit of the number of the concurrent connections.

3. The connection allocation method according to claim 1, wherein the allocating connections to the playing requests in the buffering queue according to an upper limit of the number of concurrent connections usable for the buffering queue and the receiving sequence comprises:
   when the connections allocated to the received playing requests reach the upper limit of the number of the concurrent connections,
   eliminating the playing requests releasing the connections in the buffering queue, and
   allocating corresponding connections to the playing requests in the buffering queue according to the receiving sequence until the number of the allocated connections reaches the upper limit of the number of the concurrent connections.

4. The connection allocation method according to claim 1, wherein the upper limit of the number of the concurrent connections is statically configured in the player through an attribute open interface;
   wherein the number of the concurrent connections is smaller than the upper limit of the number of concurrent connections of the webpage.

5. The connection allocation method according to claim 1, wherein the connection allocation method further comprises:
   detecting a feature parameter of a host equipment of the player; and
   dynamically determining an upper limit of the number of concurrent connections adapted to a performance of the host equipment according to the feature parameter.

6. The connection allocation method according to claim 5, wherein the dynamically determining an upper limit of the number of concurrent connections adapted to a performance of the host equipment according to the feature parameter comprises:
   determining the upper limit of the number of the concurrent connections adapted to a variation range when a variation of the feature parameter meets a variation condition.

7. A media playing device, comprising:
   a receiver, disposed to receive playing requests initiated by a player embedded in a webpage, wherein the player plays media data in the webpage;
   a memory, disposed to store the received playing requests into a buffering queue to queue according to a receiving sequence of the playing requests; and
   an allocator, disposed to allocate connections to the playing requests in the buffering queue according to an upper limit of a number of concurrent connections usable for the buffering queue and the receiving sequence, wherein the upper limit of the number of the concurrent connections usable for the buffering queue is greater than or equal to 2, and is smaller than or equal to a number of concurrent playing windows in the webpage;

wherein the connections are used for the player to request to-be-played media data.

8. The media playing device according to claim 7, wherein the allocator is disposed to: sequentially allocate the connections to the playing requests in the buffering queue according to the receiving sequence until the number of the allocated connections reaches the upper limit of the number of the concurrent connections when the connections allocated to the received playing requests are below the upper limit of the number of the concurrent connections.

9. The media playing device according to claim 7, wherein the allocator is disposed to:

when the connections allocated to the received playing requests reach the upper limit of the number of the concurrent connections, eliminate the playing requests releasing the connections in the buffering queue, and allocate corresponding connections to the playing requests in the buffering queue according to the receiving sequence until the number of the allocated connections reaches the upper limit of the number of the concurrent connections.

10. The media playing device according to claim 7, wherein the media playing device further comprises:

a detector, disposed to detect a feature parameter of a host equipment of the player; and a determiner, disposed to dynamically determine an upper limit of the number of concurrent connections adapted to a performance of the host equipment according to the feature parameter.

11. The media playing device according to claim 10, wherein the determiner is disposed to determine the upper limit of the number of the concurrent connections adapted to a variation range when a variation of the feature parameter meets a variation condition.

12. A media playing device, comprising:

a memory configured to store executable instructions; and a processor configured to perform operations when the executable instructions stored in the memory are executed, the operations comprising:

receiving playing requests initiated by a player embedded in a webpage, wherein the player plays media data in the webpage;

storing the received playing requests into a buffering queue to queue according to a receiving sequence of the playing requests; and allocating connections to the playing requests in the buffering queue according to an upper limit of a number of concurrent connections usable for the buffering queue and the receiving sequence, wherein the upper limit of the number of the concurrent connections usable for the buffering queue is greater than or equal to 2, and is smaller than or equal to a number of concurrent playing windows in the webpage;

wherein the connections are used for the player to request to-be-played media data.

13. The media playing device according to claim 12, wherein the allocating connections to the playing requests in the buffering queue according to an upper limit of the number of concurrent connections usable for the buffering queue and the receiving sequence comprises:

when the connections allocated to the received playing requests are below the upper limit of the number of the concurrent connections, sequentially allocating the connections to the playing requests in the buffering queue according to the receiving sequence, until the number of the allocated connections reaches the upper limit of the number of the concurrent connections.

14. The media playing device according to claim 12, wherein the allocating connections to the playing requests in the buffering queue according to an upper limit of the number of concurrent connections usable for the buffering queue and the receiving sequence comprises:

when the connections allocated to the received playing requests reach the upper limit of the number of the concurrent connections, eliminating the playing requests releasing the connections in the buffering queue, and allocating corresponding connections to the playing requests in the buffering queue according to the receiving sequence until the number of the allocated connections reaches the upper limit of the number of the concurrent connections.

15. The media playing device according to claim 12, wherein the upper limit of the number of the concurrent connections is statically configured in the player through an attribute open interface;

wherein the number of the concurrent connections is smaller than the upper limit of the number of concurrent connections of the webpage.

16. The media playing device according to claim 12, wherein the connection allocation method further comprises:

detecting a feature parameter of a host equipment of the player; and dynamically determining an upper limit of the number of concurrent connections adapted to a performance of the host equipment according to the feature parameter.

17. The media playing device according to claim 16, wherein the dynamically determining an upper limit of the number of concurrent connections adapted to a performance of the host equipment according to the feature parameter comprises:

determining the upper limit of the number of the concurrent connections adapted to a variation range when a variation of the feature parameter meets a variation condition.

\* \* \* \* \*